US005930039A

United States Patent [19]
Li et al.

[11] Patent Number: 5,930,039
[45] Date of Patent: *Jul. 27, 1999

[54] OPTICAL CIRCULATOR

[75] Inventors: Wei-Zhong Li, San Jose; Vincent Au-Yeung, Los Altos; Qing-Dong Guo, Sunnyvale, all of Calif.

[73] Assignee: U.S.A Kaifa Technology, Inc., Sunnyvale, Calif.

[*] Notice: This patent is subject to a terminal disclaimer.

[21] Appl. No.: 09/025,526

[22] Filed: Feb. 18, 1998

Related U.S. Application Data

[63] Continuation-in-part of application No. 08/986,064, Dec. 8, 1997.

[51] Int. Cl.[6] .................................................. G02B 5/30
[52] U.S. Cl. ........................ 359/484; 359/495; 385/11
[58] Field of Search .......................... 385/11; 359/484, 359/494, 495, 496

[56] References Cited

U.S. PATENT DOCUMENTS

| | | | |
|---|---|---|---|
| 4,650,289 | 3/1987 | Kuwahara | 359/281 |
| 4,978,189 | 12/1990 | Blonder et al. | 385/35 |
| 5,204,771 | 4/1993 | Koga | 359/281 |
| 5,319,483 | 6/1994 | Krasinski et al. | 359/484 |
| 5,408,354 | 4/1995 | Hosokawa | 359/484 |
| 5,471,340 | 11/1995 | Cheng et al. | 385/11 |
| 5,574,596 | 11/1996 | Cheng | 359/484 |
| 5,729,377 | 3/1998 | Bergmann | 359/495 |

FOREIGN PATENT DOCUMENTS 5-323124  12/1993  Japan ..................................... 359/496

*Primary Examiner*—Cassandra Spyrou
*Assistant Examiner*—John Juba, Jr.
*Attorney, Agent, or Firm*—Lumen Intellectual Property Services

[57] ABSTRACT

An improved optical circulator transfers light from a first optical port to a second optical port, and from the second port to a third port. The circulator has reciprocal and non-reciprocal polarization rotators, birefringent beam splitters and combiners, and a birefringent walk-off element as well as a polarization-dependent light bending device comprising two tapered birefringent plates. The light bending device compensates for an angle between a first light beam emanating from the first port and a second light beam propagating to the third port. The existence of this angle allows the first and third fibers to be coupled to the light beams using a single lens.

20 Claims, 7 Drawing Sheets

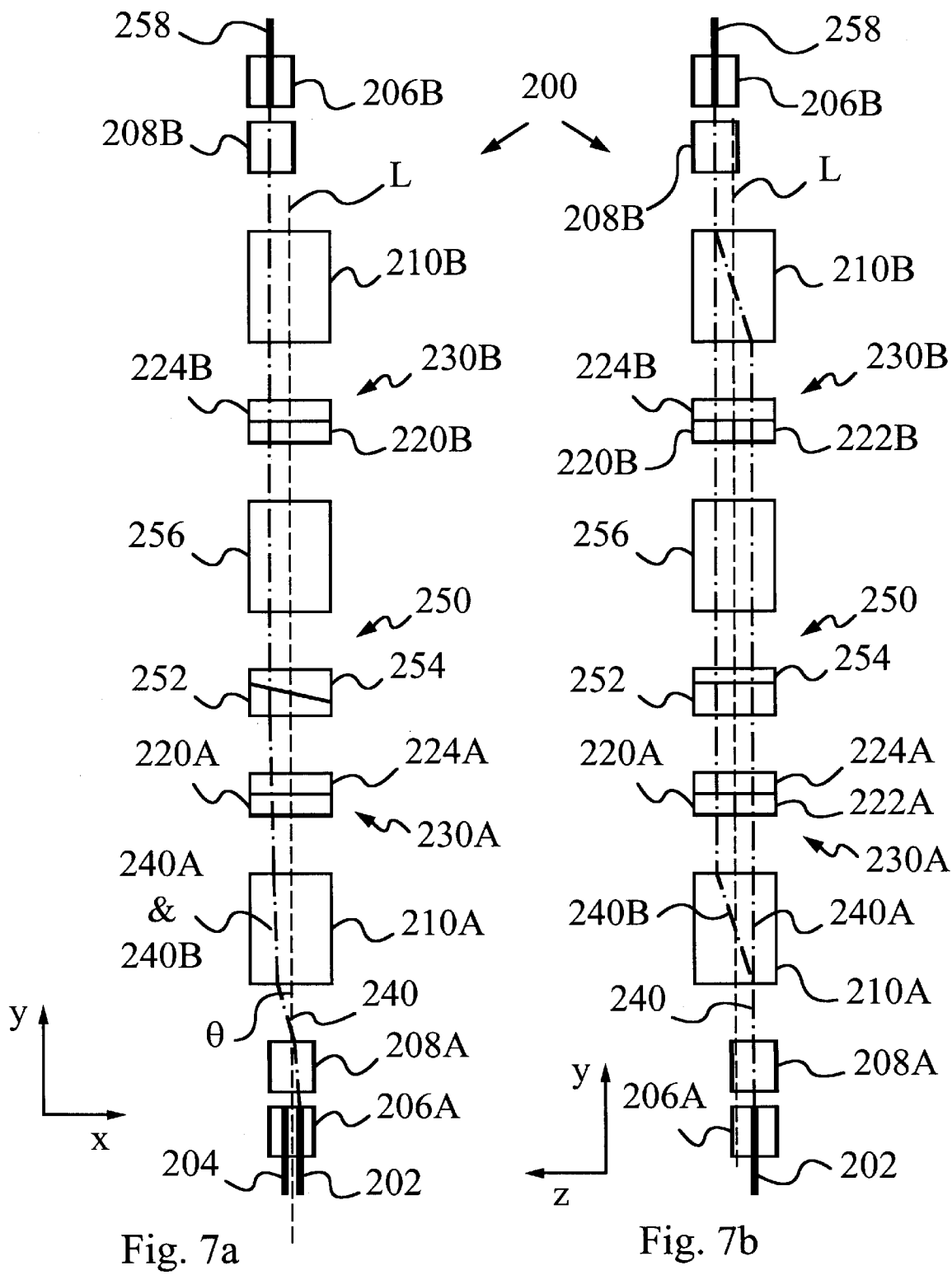

OPTICAL CIRCULATOR

RELATED APPLICATIONS

This application is a continuation-in-part of patent application Ser. No. 08/986,064 filed Dec. 8, 1997 pending.

FIELD OF THE INVENTION

This invention relates to non-reciprocal couplings for optical fibers, and in particular, to optical circulators.

BACKGROUND

An optical circulator is a device that has at least three ports for accepting optical fibers. Light that enters the circulator through the first port exits through the second port; light that enters through the second port exits through the third. The optical circulator is an inherently non-reciprocal device, since if light enters through the first port it exits through the second, but if that light is subsequently reflected back into the second port, it does not retrace its path back to the first port, but exits through the third port instead.

Circulators are necessary, for example, to use the same fiber for both receiving and transmitting data. The first port may be connected to a data transmitter, and the second port to a long distance optical fiber. In that case, data can be sent from the transmitter to the fiber. At the same time, incoming optical data from the long distance fiber enters the circulator through the second port and is directed to the third port where a receiver may be connected.

One prior art optical circulator is described in U.S. Pat. No. 4,650,289 by Kuwahara; see FIG. 1. In this circulator, the labels A, B, and C correspond to the first, second, and third ports described above (port D need not be used). This circulator suffers from the following disadvantages: it requires two spatially separated optical paths, and the ports A and C are perpendicular. This means that the circulator will be bulky when a more compact size is desirable.

A more compact circulator is described in U.S. Pat. No. 5,204,771 by Koga; see FIG. 2. This circulator shows an improvement over the previous one since the two optical paths can be in close proximity, and the first and third ports (designated 27 and 28 in the drawing) are parallel. Unfortunately, this device still suffers from a disadvantage. A lens must be placed between the first optical fiber and the circulator to collimate light coming from the first fiber. A lens must also be placed between the third fiber and the circulator to focus light onto the third fiber. If the first and third fibers are far enough apart that there is room to insert two lenses side by side (one for each fiber), the circulator will have to be quite large. Such a circulator will also be expensive, since the cost increases with the size of the components.

If the first and third ports (27 and 28 in FIG. 2) are very close together, the first and third fibers will have to share a common lens for collimating and focusing. However, it is impossible for a single lens to perform adequately for both fibers. The difficulty can be traced to the fact that the light beams coupled to the first and third ports are parallel, and a single lens cannot focus two parallel beams to two different points (i.e., to two different fibers). This prior art therefore suffers from the shortcoming that it cannot be manufactured economically when the circulator is large, and it cannot be efficiently coupled to optical fibers when the circulator is small.

OBJECTS AND SUMMARY OF THE INVENTION

In view of the above, it is an object of the present invention to provide a compact and economical optical circulator that can be efficiently coupled to optical fibers.

The invention consists of an optical circulator having at least three ports for optical fibers. Light beams coupled to the first and third fibers are not parallel; there is a slight angle between the two beams. Because of this angle, a single lens may be used for coupling both the first and the third fibers to the circulator.

The invention further consists of a light-bending device comprising two tapered birefringent plates, situated to compensate for the angle between the light beams coupled to the first and third fibers.

BRIEF DESCRIPTION OF THE DRAWINGS

FIG. 7a is a top plan view of the circulator of FIG. 6 showing a light beam propagating from the first fiber to the second fiber.

FIG. 7b is a side view of the circulator of FIG. 6 showing the light beam propagating from the first fiber to the second fiber.

DETAILED DESCRIPTION OF THE INVENTION

Figure 1:
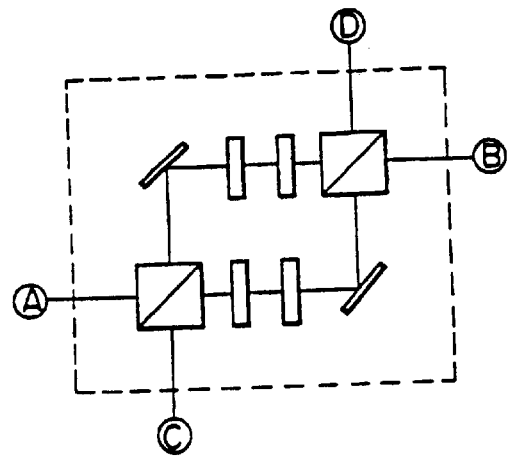
FIG. 1 shows a prior art optical circulator by Kuwahara.
Figure 2:
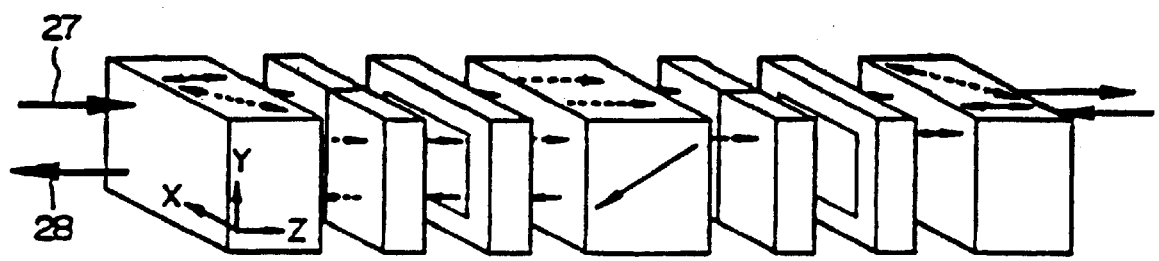
FIG. 2 shows a prior art optical circulator by Koga.
Figure 3:
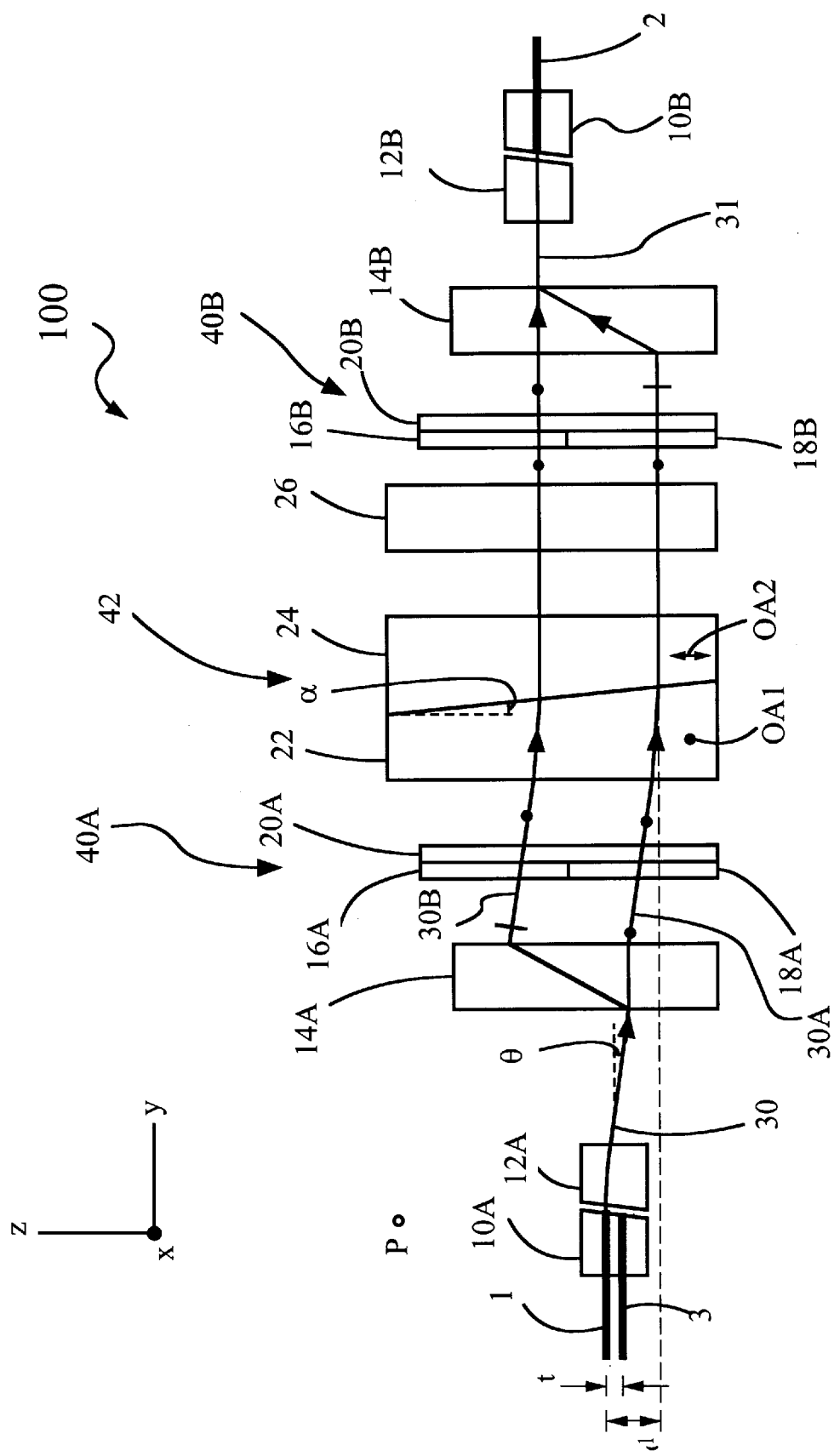
FIG. 3 shows how light is transmitted from the first optical fiber to the second optical fiber in a circulator according to the invention.

FIG. 3 shows a circulator 100 according to the invention. A first optical fiber 1 is inserted into a first glass capillary 10A. A second optical fiber 2 is inserted into a second glass capillary 10B opposite first fiber 1. A third optical fiber 3 is inserted into first glass capillary 10A adjacent to fiber 1, so that fiber 3 and fiber 1 are parallel.

A set of orthogonal reference axes is arranged so that the y-axis is parallel to fibers 1, 2, and 3. A reference point P is located near the first glass capillary 10A.

Fiber 1 emits a light beam 30 that is collimated by a first lens 12A. Lens 12A also causes beam 30 to make an angle θ with respect to the y-axis. Preferably, lens 12A is a graded index (GRIN) lens.

Beam 30 then passes through a first birefringent block 14A. Beam 30 is thereby divided into two beams having orthogonal polarizations, specifically beams 30A and 30B, corresponding to the ordinary and extraordinary rays in birefringent block 14A. Beam 30A is polarized along the x-axis (out of the page); this polarization is indicated by a dot in FIG. 3. Beam 30B is polarized in the y-z plane; this polarization is indicated by a line segment. The length of birefringent block 14A is adjusted to obtain a spatial separation between beams 30A and 30B which permits to pass them through independent optical elements.

Thus, beam 30A enters a first half wave plate 18A which rotates the plane of polarization by 45° in the counterclockwise direction as seen from point P in FIG. 3. Beam 30A then enters a first Faraday rotator 20A which rotates the plane of polarization by 45° in the clockwise direction as seen from point P. The net effect of half wave plate 18A and Faraday rotator 20A (the first a reciprocal device and the second non-reciprocal), therefore, is to leave the polarization of beam 30A unaltered. Beam 30B, meanwhile, enters a second half wave plate 16A positioned above first half wave plate 18A. Second half wave plate 16A rotates the plane of polarization of beam 30B by 45° clockwise as seen from P; i.e., half wave plate 16A effects a rotation in the opposite direction to half wave plate 18A. Beam 30B then passes through a Faraday rotator 20A, which again rotates the plane of polarization by 45° clockwise as seen from P. Therefore, after passing through half wave plate 16A and Faraday rotator 20A, the polarization of beam 30B is in the x-direction, or parallel to the polarization of beam 30A.

Half wave plates 16A and 18A, together with Faraday rotator 20A, make up a first compound polarization rotator 40A that renders two orthogonal polarizations parallel to each other.

At this point beams 30A and 30B still propagate at angle θ with respect to the y-axis as they exit rotator 20A. This angle of propagation is changed by a polarization-dependent light guiding device 42. Device 42 consists of a first tapered birefringent plate 22 and a second tapered birefringent plate 24. The tapering of plate 22 is complementary to the tapering of plate 24, and each plate is tapered by an angle α. Plates 22 and 24 are made from the same birefringent material and each plate has two indices of refraction: $n_e$ and $n_o$, corresponding to the extraordinary and ordinary rays. In the embodiment illustrated in FIG. 3, $n_o > n_e$.

The index of refraction in general determines how much a light ray will bend, or refract, upon entering a material. When the index of refraction is known, the amount of refraction can be determined by Snell's law. A birefringent material has two indices of refraction, indicating that different polarizations of light will refract by different amounts.

Plate 22 has an optic axis OA1 that is oriented parallel to the x-axis. Therefore beams 30A and 30B are viewed as extraordinary rays in plate 22, and are therefore refracted according to the extraordinary index of refraction $n_e$. Plate 24 has an optic axis OA2 that is parallel to the z-axis, so beams 30A and 30B are ordinary rays within plate 24. Therefore beams 30A and 30B are refracted upon passing from plate 22 to plate 24 because of the difference between indices of refraction $n_e$ and $n_o$.

The angle α is adjusted so that beams 30A and 30B are rendered parallel to the y-axis by light guiding device 42. Using Snell's law at each interface, the relationship between the angles α and θ is:

$$\sin \theta = n_e \sin \{\sin^{-1}[(n_o/n_e) \sin \alpha] - \alpha\}. \quad (1)$$

Beams 30A and 30B exit plate 24 and enter a second birefringent block 26. The optical axis of block 26 is oriented such that beams 30A and 30B are ordinary rays in block 26 and thus remain undeflected.

Next, beam 30A enters a half wave plate 18B which rotates the plane of polarization of beam 30A by 45° counterclockwise as seen from point P. Beam 30A then passes through a Faraday rotator 20B which rotates the polarization by another 45° counterclockwise as seen from P. Beam 30A is now polarized in the z-direction (indicated by a line segment in the figure).

Meanwhile, beam 30B passes through a half wave plate 16B which rotates the polarization 45° clockwise as seen from P. Beam 30B then enters Faraday rotator 20B which rotates the plane of polarization of beam 30B by 45° counterclockwise as seen from point P. Consequently, half wave plate 16B and rotator 20B together have no net effect on the polarization of beam 30B.

Half wave plates 16B and 18B and Faraday rotator 20B together comprise a second compound polarization rotator 40B that renders two parallel polarizations perpendicular to each other.

Beams 30A and 30B subsequently pass through a third birefringent block 14B, where beam 30A is the extraordinary ray and beam 30B is ordinary. Block 14B combines beams 30A and 30B to form a single beam 31 that is in general unpolarized since it combines the two orthogonal polarizations of beams 30A and 30B.

Beam 31 is focused by a second lens 12B (preferably a GRIN lens) and enters optical fiber 2 mounted in glass capillary 10B.

Figure 4:
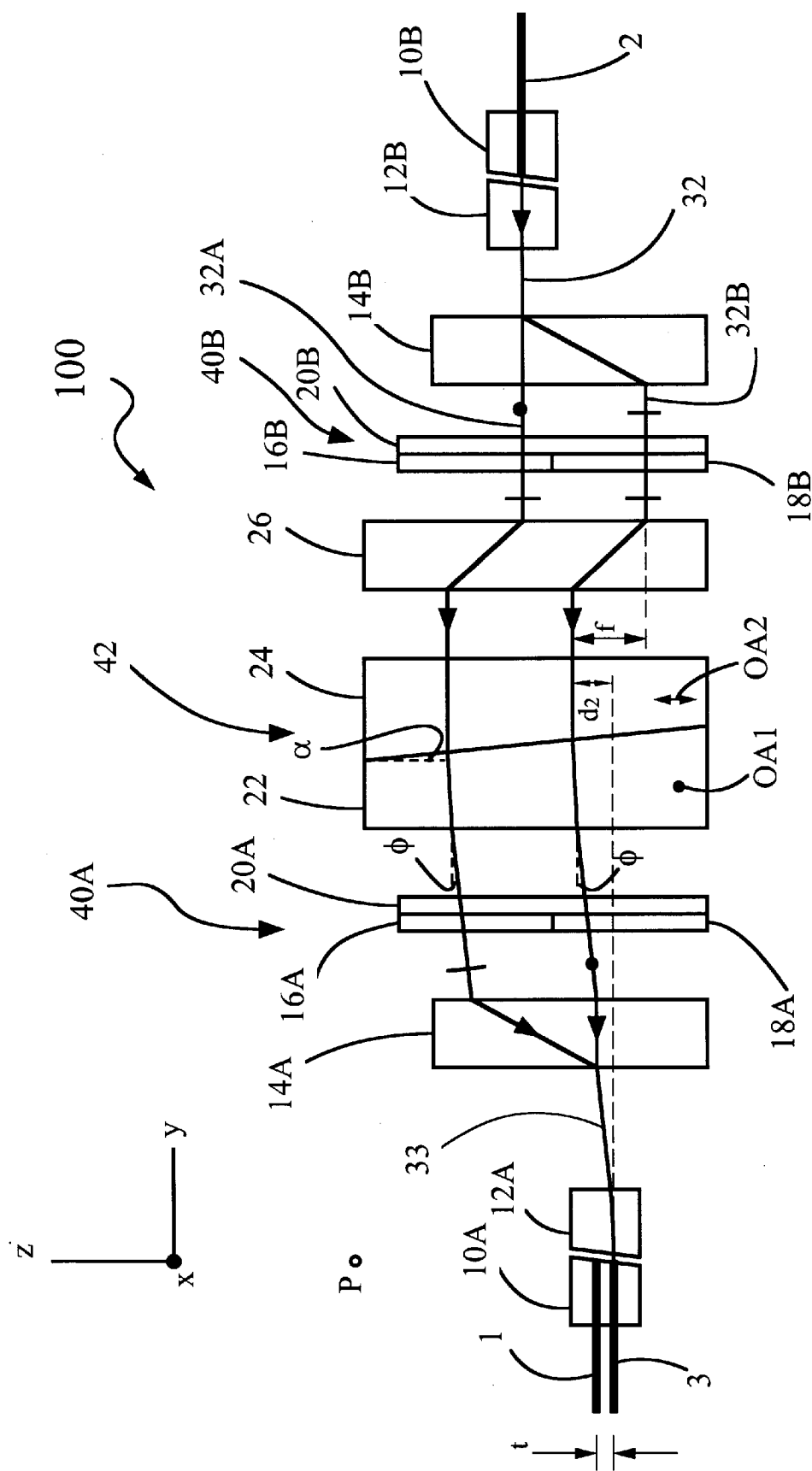
FIG. 4 shows how light is transmitted from the second optical fiber to the third optical fiber in the circulator of FIG. 4.

The description so far shows how light starting from fiber 1 is guided into fiber 2. For circulator 100 to work properly, light entering the circulator from fiber 2 must be channeled into fiber 3. In other words, circulator 100 has the property of channeling light from fiber 1 to fiber 2 and from fiber 2 to fiber 3 without any light being channeled from fiber 2 back to fiber 1. This second step is shown in FIG. 4.

Thus, a beam 32 exits fiber 2 and is collimated by lens 12B. Beam 32 then enters birefringent block 14B and is split into two beams, 32A and 32B, having orthogonal polarizations. Beam 32A is ordinary, beam 32B extraordinary in block 14B. Upon leaving block 14B, beam 32A is polarized in the x-direction and beam 32B is polarized in the y-direction, as indicated in FIG. 4.

Beams 32A and 32B next enter compound polarization rotator 40B. Beam 32A enters Faraday rotator 20B, which rotates the polarization of beam 32A by 45° counterclockwise as seen from point P. Then beam 32A enters half wave plate 16B, which rotates the polarization of beam 32A by another 45° counterclockwise as seen from P.

Meanwhile the polarization of beam 32B is rotated by 45° counterclockwise as seen from point P by Faraday rotator 20B. The polarization of beam 32B is then rotated back 45° clockwise as seen from P by half wave plate 18B.

Therefore, just before beams 32A and 32B enter birefringent block 26, they are both polarized in the z-direction. Here the non-reciprocal nature of circulator 100 is already clear, since if beams 32A and 32B were to exactly retrace the paths of beams 30A and 30B (FIG. 3), they should be polarized in the x-direction. The origin of the non-reciprocity is the Faraday rotator 20B, whose direction of polarization rotation does not reverse with the change in direction of light propagation.

Beams 32A and 32B enter birefringent block 26, where they are extraordinary rays and are offset by a distance f. Both beams 32A, 32B then enter light guiding device 42, which causes beams 32A and 32B to each make an angle φ with respect to the y-axis.

Beams 32A and 32B now enter birefringent plate 24. The optic axis OA2 of plate 24 is parallel to the polarizations of beams 32A and 32B. Beams 32A and 32B are therefore extraordinary rays within plate 24, but are undeflected since they are normally incident upon plate 24.

Upon leaving plate 24 and entering plate 22, however, beams 32A and 32B become ordinary rays, since their polarizations are perpendicular to the optic axis OA1 of plate 22. Beams 32A and 32B therefore refract upon entering plate 22 due to the difference between refraction indices ne and no. When beams 32A and 32B exit plate 22, they refract again to exit at angle φ with respect to the y-axis. Using Snell's law, the following relationship between angle φ and angle α is stated as follows:

$$\sin \phi = n_o \sin \{\alpha - \sin^{-1}[(n_e/n_o) \sin \alpha]\}. \quad (2)$$

After leaving light guiding device 42, beam 32A then passes through Faraday rotator 20A and half wave plate 16A with no net effect on its polarization. Beam 32B passes through Faraday rotator 20A and half wave plate 18A; the result is a rotation of the polarization of beam 32A by 90° clockwise as seen from point P. Beams 32A and 32B now have orthogonal polarizations and are combined into a single beam 33 by birefringent block 14A. Beam 33 is subsequently focused by lens 12A onto fiber 3.

Birefringent block 26 plays an important role in guiding light from fiber 2 to fiber 3. Since light guiding device 42 bends beams 32A and 32B by the angle φ, beams 32A and 32B travel laterally (in the negative z-direction) as well as longitudinally (in the negative y-direction) after they leave device 42. This lateral travel is compensated by block 26.

To be precise, beams 32A and 32B are offset a distance f by birefringent block 26. The distance along the z-axis between the point where beam 32B enters plate 24 and fiber 3 is $d_2$ (see FIG. 4). The distance along the z-axis between fiber 1 and the point where beam 30A leaves plate 24 is $d_1$ (see FIG. 3). The vertical or z-axis distance between fiber 1 and fiber 3 is t. The relation between these quantities is:

$$f = d_1 + d_2 - t. \quad (3)$$

This equation teaches how to design block 26 to have the correct offset f given the other parameters of circulator 100, i.e., when $d_1$, $d_2$, and t are known.

In an alternative embodiment, the apparatus is designed in such a way that $d_1 + d_2 = t$. Eq. (3) then implies that f=0, which means that birefringent block 26 can be eliminated completely from the design.

If angle θ were exactly equal to angle φ, fibers 1 and 3 would be placed symmetrically with respect to the center of lens 12A. That is, the lateral distance (distance measured along the z-axis) from fiber 1 to the center of lens 12A would equal the lateral distance from fiber 3 to the center of lens 12A. However, angles θ and φ are only approximately equal: if angles θ, φ, and α are all small, then equations (1) and (2) yield to a first approximation:

$$\theta \approx (n_o - n_e)\alpha \approx \phi$$

To a better approximation, angle θ differs slightly from angle φ. This difference can be accommodated in at least two ways. The first option is to adjust the lateral positions (i.e. z-coordinates) of fibers 1 and 3 so that the fibers are asymmetric with respect to the center of lens 12A. The second, preferred option is to place fibers 1 and 3 symmetrically with respect to the center of lens 12A, and to rotate light guiding device 42 slightly about an axis parallel to the x-axis, thereby altering equations (1) and (2) to ensure that θ=φ. Either approach represents a minor adjustment of the overall apparatus. In practice, angles φ and θ are between 1° and 3°, and light guiding device 42 is rotated a fraction of a degree.

Birefringent elements 14A, 14B, 22, 24, and 26 can be made of any birefringent material, such as rutile, calcite, or yttrium orthovanadate.

It should be clear that several variations of the above embodiment are possible and remain within the scope of the invention. For example, the polarizations of beams 30A and 30B need not be exactly as shown. It is only important that the polarizations of beams 30A and 30B are orthogonal or perpendicular to each other when the beams exit block 14A, and that the polarizations are parallel after leaving rotator 20A. When the polarizations of beams 30A and 30B are not as described above, the optic axes of the birefringent elements 14A, 14B, 22, 24, and 26 are adjusted accordingly. This adjustment changes the polarizations of beams 32A and 32B. However, as is apparent to a person of average skill in the art, the principles of circulator 100 remain unchanged.

Thus, in another embodiment, beam 30A is extraordinary and beam 30B is ordinary in block 14A. In this embodiment, the beams have complementary properties in block 14B: beam 30A is ordinary and beam 30B is extraordinary. This arrangement ensures, as does the embodiment of circulator 100, that beams 30A and 30B both traverse approximately the same optical path, and therefore the overall phase relation between them is maintained.

Variations of light guiding device 42 are also possible.

Figure 5A:
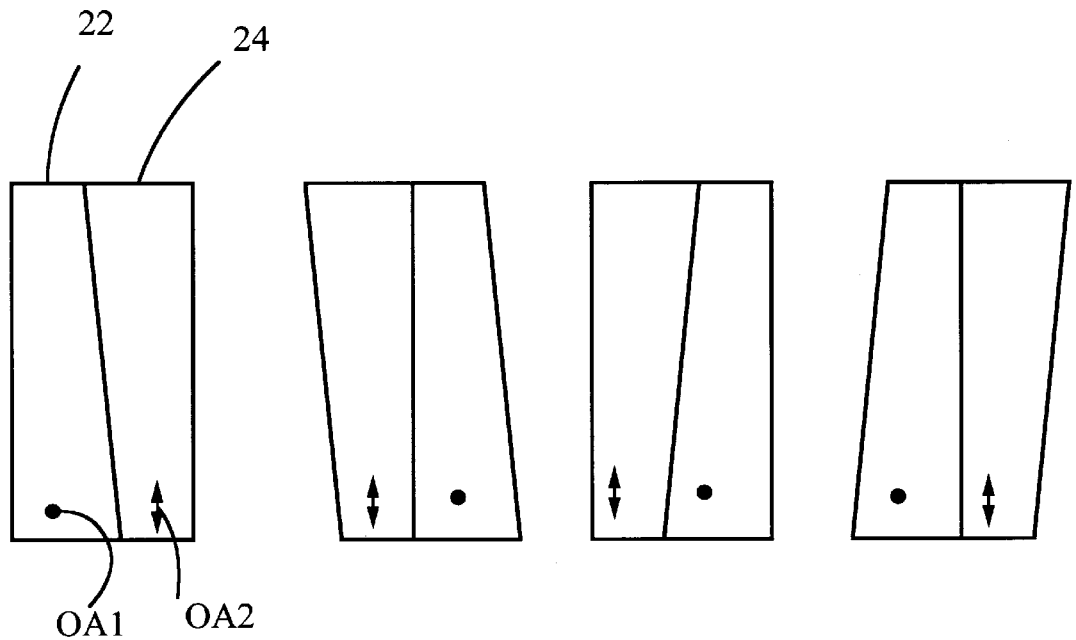
FIG. 5a shows various embodiments of polarization-dependent light guiding device when $n_o > n_e$.
Figure 5B:
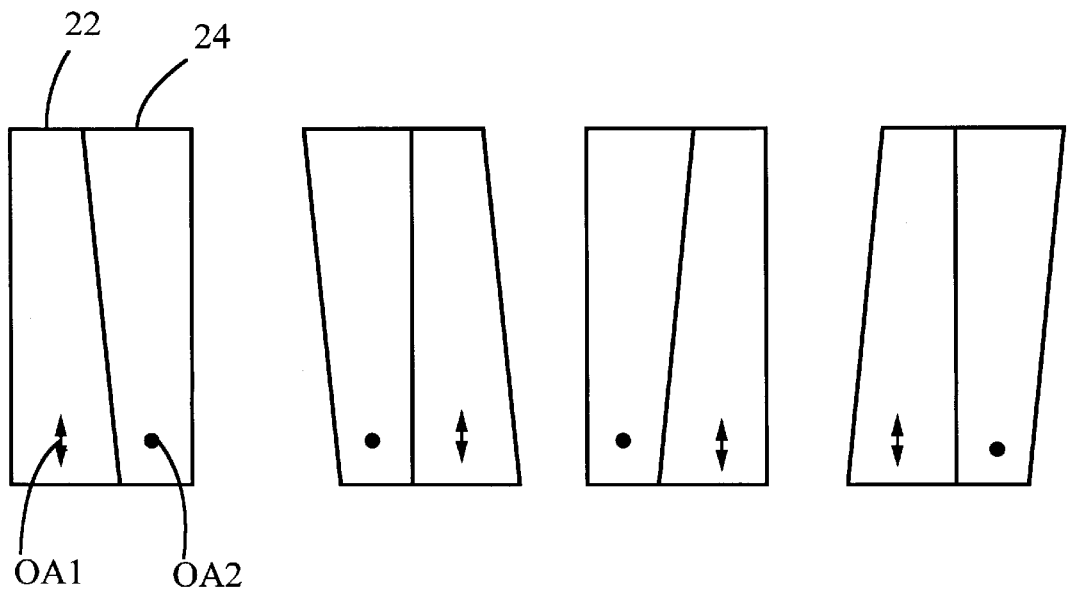
FIG. 5b shows various embodiments of polarization-dependent light guiding device when $n_o < n_e$.

FIG. 5a shows different shapes and orientations of optic axes OA1 and OA2 that plates 22 and 24 can have when $n_o > n_e$. If plates 22 and 24 are made of some birefringent material with $n_o < n_e$, other geometries are used, as shown in FIG. 5b. Still other variations are possible: in the examples of FIG. 5a and FIG. 5b, plates 22 and 24 each have one face parallel to the z-axis. However, a more general trapezoidal shape can be used for either or both of plates 22 and 24, with no faces parallel to the z-axis. Furthermore, plate 22 need not be made of the same material as plate 24.

Figure 6:
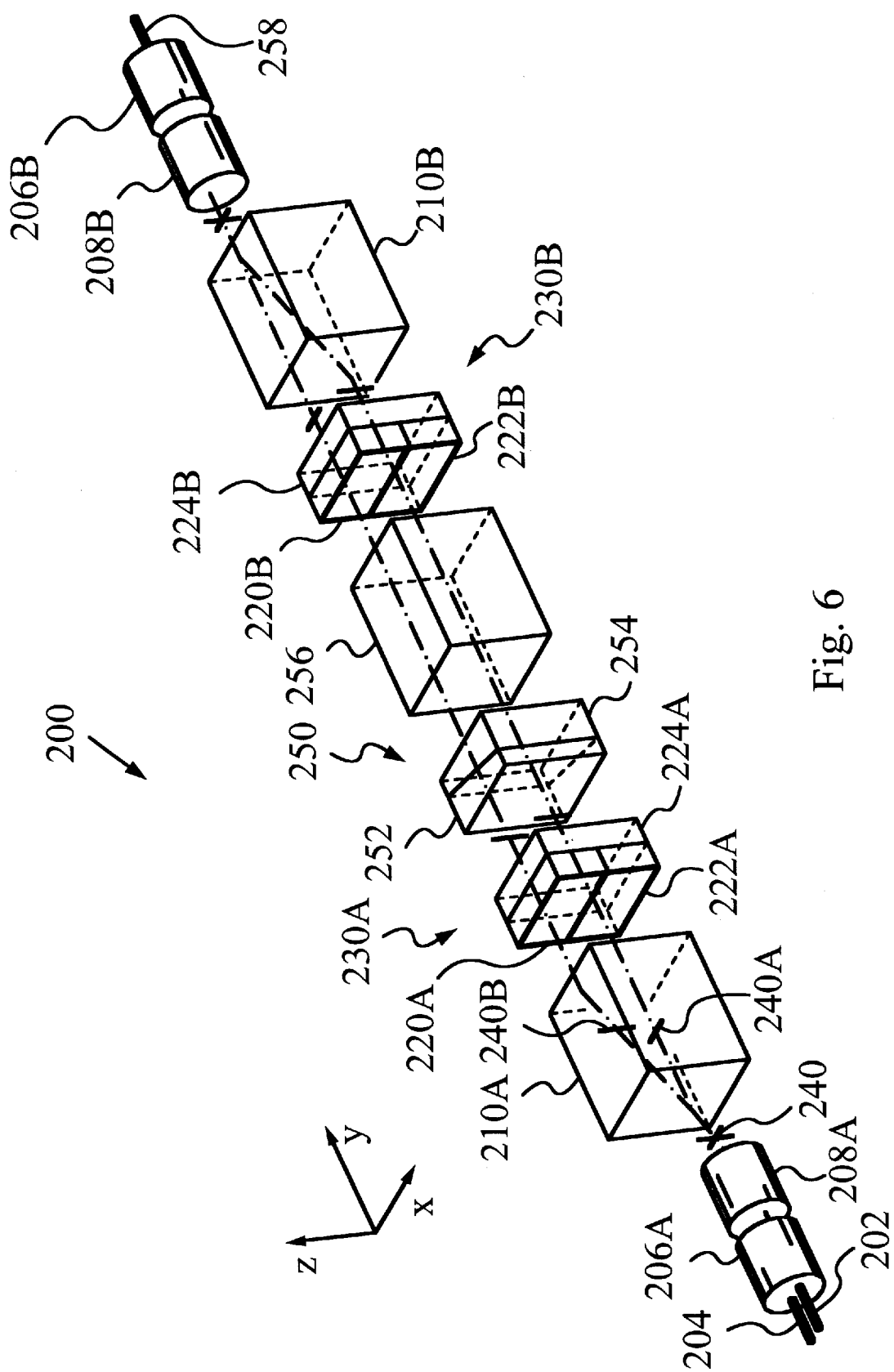
FIG. 6 shows a three dimensional view of a preferred circulator with a light beam propagating from a first fiber to a second fiber.

In a preferred embodiment a circulator 200 is designed such that angles θ and φ lie in the same plane while the walk-off in the birefringent blocks takes place in a perpendicular plane. The general construction and operation of this embodiment is analogous to that of circulator 100 and is illustrated in the three dimensional view of FIG. 6.

First and third fibers 202, 204 are inserted in parallel and adjacent to each other into a glass capillary 206A which is followed by a first lens 208A. A first block of birefringent material 210A, a first compound polarization rotator 230A, a light guiding device 250, a second birefringent block 256, a second compound polarization rotator 230B and a third block of birefringent material 210B are located along a longitudinal axis L of circulator 200. A second lens 208B and a second glass capillary 206B holding third fiber 258 are found at the opposite end of device 200. In distinction to circulator 100 where first and third fibers 1, 3 are inserted one below the other (along the z-axis) fibers 202, 204 are arranged next to each other (along the x-axis).

A first light beam 240 propagating from first fiber 202 enters first block 210A and the two orthogonal polarizations 240A and 240B are walked off within block 210A as shown. These polarizations continue propagating through the elements of circulator 200 until they are recombined by third block 210B and focused by second lens 208B into second fiber 258.

The top view of FIG. 7a also shows first light beam 240 propagating from fiber 202 to fiber 258 through the elements of circulator 200. Angle θ is made by beam 240 with respect to longitudinal axis L when exiting through first lens 208A lies in the x-y plane. Meanwhile, as shown in the side view of FIG. 7b, the walk off of the two orthogonal polarizations 240A and 240B in birefringent block 210A occurs in the y-z plane.

Figures 8A, 8B:
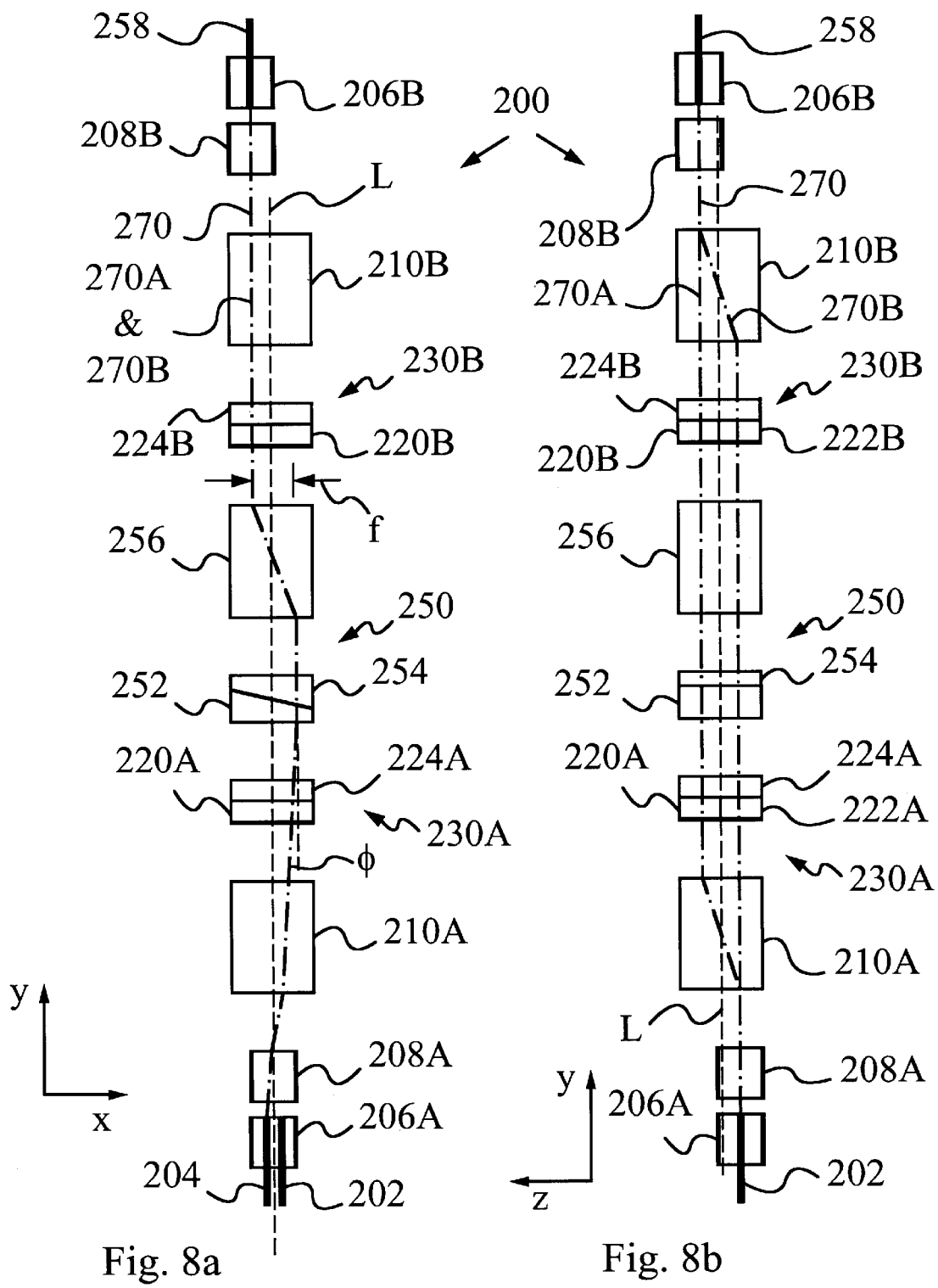
FIG. 8a is a top plan view of the circulator of FIG. 6 showing a light beam propagating from the second fiber to the third fiber.
FIG. 8b is a side view of the circulator of FIG. 6 showing the light beam propagating from the second fiber to the third fiber.

When a second light beam 270 propagates from second fiber 258 to third fiber 204, as illustrated in FIGS. 8a–b, it is offset by distance f in second block 256. Note that offset distance f is in the x-y plane (FIG. 8a). Next, in light guiding device 250 beam 270 is bent at angle φ with respect to longitudinal axis L. In other words, beam 270 exits light guiding device 250 at angle φ. Angle φ also lies in the x-y plane. Thus, angles φ and θ lie in planes which are parallel while the walk-off occurs in a plane perpendicular to them.

The advantage of having angles φ and θ lie in an x-y plane while the walk-off takes place in the y-z plane is that it is easier to adjust angles φ and θ independently of the walk-off. Specifically, in practice it is easier to adjust the positions of the elements of circulator 200 to obtain proper coupling of beams 240 and 270 between fibers 202, 258 and 204 when the walk-off and the compensating angles φ, θ are in perpendicular planes. Also, in this configuration the elements of circulator 200 can be made smaller and the entire circulator is easier to manufacture.

In the broad sense, the circulator can be used to couple light between three optical ports. The ports can include optical fibers as in the embodiments above or other optical elements.

It will be apparent to a person of average skill in the art that many variations of the circulator are possible within the scope of the invention. Accordingly, the scope of the invention should be determined by the following claims and their legal equivalents.

We claim:

1. An optical circulator for coupling light from a first fiber to a second fiber and from said second fiber to a third fiber, said first fiber and said third fiber being located adjacent to each other along a longitudinal axis, and said second fiber being located opposite said first and third fibers along said longitudinal axis, said optical circulator comprising along said longitudinal axis in sequence from said first fiber to said second fiber:
    a) a first lens for guiding light from said first fiber and to said third fiber;
    b) a first block of birefringent material for separating and combining mutually orthogonal polarizations;
    c) a first compound polarization rotator for rendering mutually parallel polarizations orthogonal and mutually orthogonal polarizations parallel;
    d) a polarization-dependent light guiding device, comprising a first and a second tapered plates of birefringent material, said first plate having a first optic axis, said second plate having a second optic axis, said first optic axis and said second optic axis being mutually perpendicular;
    e) a polarization-dependent beam deflector comprising a second block of birefringent material,
    f) a second compound polarization rotator for rendering mutually parallel polarizations orthogonal and mutually orthogonal polarizations parallel;
    g) a third block of birefringent material for separating and combining mutually orthogonal polarizations; and
    h) a second lens for guiding light to said second fiber and from said second fiber,
        wherein light passing from said first fiber exits said first lens at an angle θ with respect to said longitudinal axis, and said light passing from said second fiber exits said light guiding device at an angle φ with respect to said longitudinal axis.

2. The optical circulator of claim 1 wherein said first and second lenses are graded index lenses.

3. The optical circulator of claim 1 wherein said angle θ is between 1° and 3°, and said angle φ is between 1° and 3°.

4. The optical circulator of claim 1 wherein said polarization-dependent light guiding device is rotated such that said angle φ is substantially equal to said angle θ.

5. The optical circulator of claim 1 wherein said first, second, and third blocks of birefringent material and said first and second tapered plates comprise a material selected from the group consisting of rutile, calcite, and yttrium orthovanadate.

6. The optical circulator of claim 1 wherein said first compound polarization rotator comprises a first and a second reciprocal polarization rotators and a first non-reciprocal polarization rotator; and said second compound polarization rotator comprises third and fourth reciprocal polarization rotators and a second non-reciprocal polarization rotator.

7. The optical circulator of claim 1 wherein said polarization-dependent beam deflector offsets light traveling from said second port by a distance f with respect to said longitudinal axis.

8. The optical circulator of claim 7 wherein said distance f is in the plane of said angle φ.

9. The optical circulator of claim 1 wherein said angle θ lies in a first plane and said angle φ lies in a second plane parallel to said first plane.

10. The optical circulator of claim 9 wherein said mutually orthogononal polarizations and said mutually parallel polarizations are separated and combined in said first block of birefringent material and in said second block of birefringent material in a third plane perpendicular to said first plane and said second plane.

11. An improved optical circulator for coupling a first port, a second port, and a third port, said circulator having a longitudinal axis along which are sequentially situated:
    a) a first lens;
    b) a first beam splitter and combiner comprising a first block of birefringent material for separating and combining mutually orthogonal polarizations;
    c) a first compound polarization rotator for rendering mutually parallel polarizations orthogonal and mutually orthogonal polarizations parallel, said first compound polarization rotator comprising first and second reciprocal polarization rotators and a first non-reciprocal polarization rotator;
    d) a polarization-dependent beam path deflector comprising a second block of birefringent material;
    e) a second compound polarization rotator comprising third and fourth reciprocal polarization rotators and a second non-reciprocal polarization rotator;
    f) a second beam splitter and combiner comprising a third block of birefringent material;
    g) a second lens;
    wherein the improvement comprises:
        a polarization-dependent light guiding device comprising a first and a second tapered plates of birefringent material, said first plate having a first optic axis, said second plate having a second optic axis, said first optic axis being perpendicular to said second optic axis, said polarization-dependent light guiding device being positioned between said polarization-dependent beam path deflector and said first compound polarization rotator; and wherein
        a first light beam propagating from said first port enters said first birefringent block at an angle θ with respect to said longitudinal axis; and
        a second light beam propagating from said second port exits said polarization-dependent light guiding device at an angle θ with respect to said longitudinal axis.

12. The improved optical circulator of claim 11 wherein said first and second lenses are graded index lenses.

13. The improved optical circulator of claim 11 wherein the sum of said angles θ and φ is between 2° and 6°.

14. The improved optical circulator of claim 11 wherein said first port is adjacent and parallel to said third port.

15. The improved optical circulator of claim 11 wherein said first beam propagating from said first port passes through said first lens, and said second beam propagating from said second port passes through said first lens and enters said third port.

16. The improved optical circulator of claim 11 wherein said first, second, and third blocks of birefringent material and said first and second tapered plates comprise a material selected from the group consisting of rutile, calcite, and yttrium orthovanadate.

17. The improved optical circulator of claim 11 wherein said angle θ lies in a first plane and said angle φ lies in a second plane parallel to said first plane.

18. The improved optical circulator of claim 17 wherein said mutually orthogonal polarizations and said mutually parallel polarizations are separated and combined in said first block of birefringent material and in said second block of birefringent material in a third plane perpendicular to said first plane and said second plane.

19. The improved optical circulator of claim 11 wherein said polarization-dependent beam path deflector offsets said second light beam by a distance f with respect to said longitudinal axis.

20. The optical circulator of claim 19 wherein said distance f is in the plane of said angle φ.

* * * * *